United States Patent
Taherzadeh Boroujeni et al.

(10) Patent No.: US 11,777,779 B2
(45) Date of Patent: Oct. 3, 2023

(54) DYNAMIC SYMBOL OFFSET INDICATION FOR SEARCH SPACES

(71) Applicant: QUALCOMM Incorporated, San Diego, CA (US)

(72) Inventors: Mahmoud Taherzadeh Boroujeni, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/647,904

(22) Filed: Jan. 13, 2022

(65) Prior Publication Data
US 2022/0224582 A1 Jul. 14, 2022

Related U.S. Application Data

(60) Provisional application No. 63/137,494, filed on Jan. 14, 2021, provisional application No. 63/137,462, filed on Jan. 14, 2021.

(51) Int. Cl.
*H04B 7/024* (2017.01)
*H04L 27/26* (2006.01)
*H04W 72/0446* (2023.01)
*H04L 5/00* (2006.01)
*H04W 72/23* (2023.01)

(52) U.S. Cl.
CPC ........ *H04L 27/2657* (2013.01); *H04L 5/0041* (2013.01); *H04W 72/0446* (2013.01); *H04W 72/23* (2023.01)

(58) Field of Classification Search
CPC ......... H04W 72/0453; H04W 74/0833; H04W 48/08; H04W 52/0235; H04W 72/0446; H04W 74/002; H04W 76/27; H04L 5/0053; H04L 5/0094; H04L 5/0048; H04L 5/001; H04L 5/0055; H04L 1/1896; H04L 5/0044; H04L 1/1812; H04B 1/7075; H04B 17/309; H04B 10/6164; H04B 7/0413; H04B 7/18519; H04B 10/6165; H04B 7/18513; H04B 1/7073
USPC .......................................................... 375/262
See application file for complete search history.

(56) References Cited

U.S. PATENT DOCUMENTS

| | | |
|---|---|---|
| 2019/0297637 A1* | 9/2019 | Liou .................... H04W 72/23 |
| 2021/0321406 A1* | 10/2021 | Sakhnini .......... H04W 72/0446 |
| 2022/0159701 A1* | 5/2022 | Islam ................... H04L 5/0094 |

* cited by examiner

*Primary Examiner* — Eva Y Puente
(74) *Attorney, Agent, or Firm* — Dinsmore & Shohl LLP

(57) ABSTRACT

Certain aspects of the present disclosure provide techniques for indicating dynamic time offset(s) for control resource sets (CORESETS). A method that may be performed by a user equipment (UE) includes receiving signaling indicating a dynamic time offset for monitoring occasions of a search space associated with a CORESET, and based on the dynamic time offset, monitoring for a physical downlink control channel (PDCCH) in monitoring occasions.

20 Claims, 13 Drawing Sheets

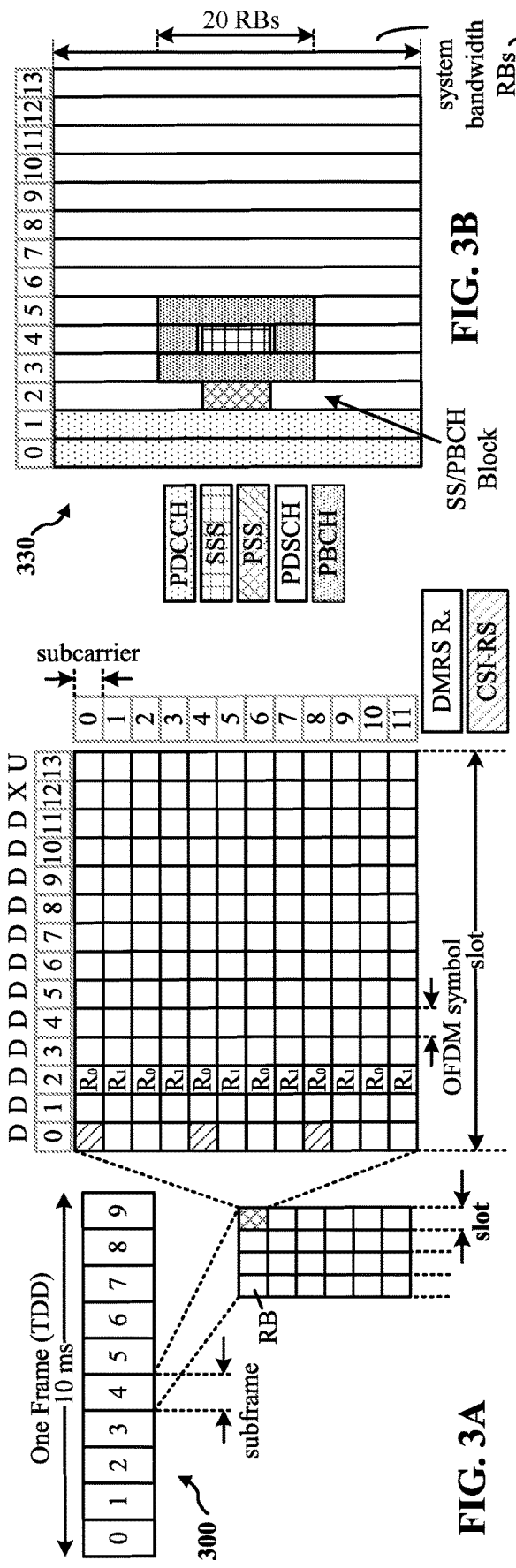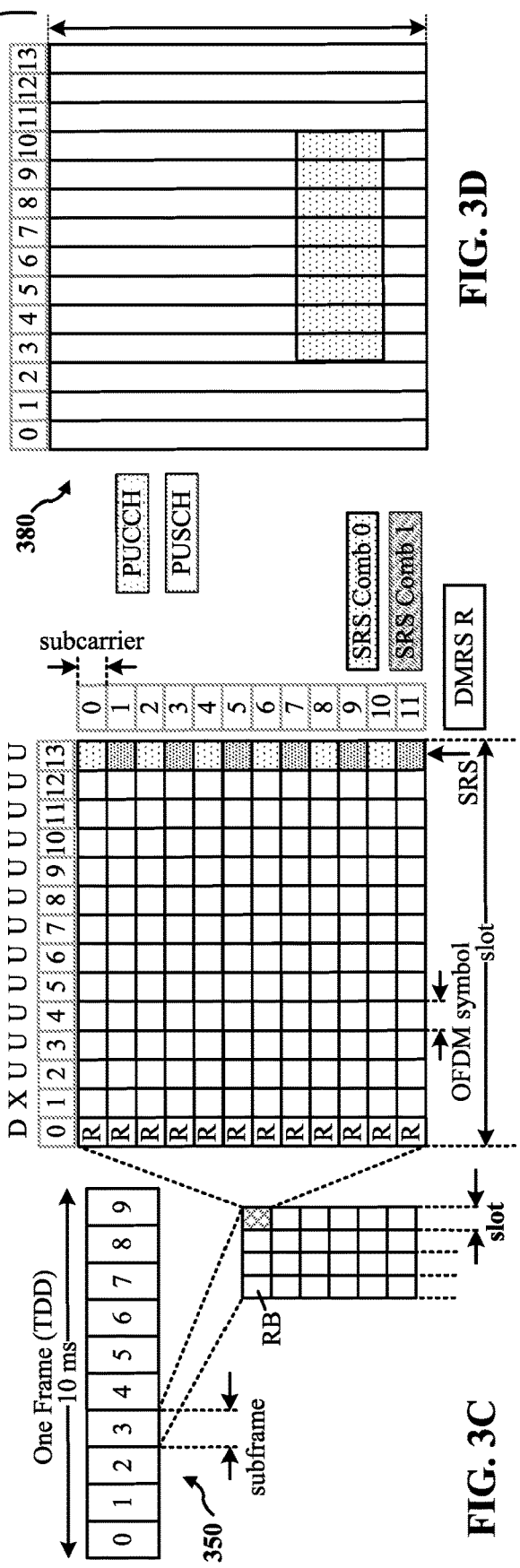
FIG. 3A  FIG. 3B  FIG. 3C  FIG. 3D

Time offset for monitoring occasions of a search space indicated by dynamic symbol offset

DYNAMIC SYMBOL OFFSET INDICATION FOR SEARCH SPACES

CROSS-REFERENCE TO RELATED APPLICATIONS

This application claims the benefit of and priority to U.S. Provisional Patent Application No. 63/137,494, filed on Jan. 14, 2021, and U.S. Provisional Patent Application No. 63/137,462, filed on Jan. 14, 2021, the entire contents of each of which are incorporated herein by reference.

BACKGROUND

Field of the Disclosure

Aspects of the present disclosure relate to wireless communications, and more particularly, to techniques for indicating time (e.g., OFDM symbol) and frequency offsets for control resource sets (CORESETS).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These and other multiple access technologies have been adopted in various telecommunication standards to provide a common protocol that enables different wireless devices to communicate on a municipal, national, regional, and even global level. However, as the demand for mobile broadband access continues to increase, there exists a need for further improvements in these and emerging wireless communications technologies.

SUMMARY

Certain aspects can be implemented in a method for wireless communication by a user equipment (UE). The method generally includes receiving signaling indicating a dynamic time offset for physical downlink control channel (PDCCH) monitoring occasions associated with a control resource set (CORESET) and, based on the dynamic time offset, monitoring for a physical downlink control channel (PDCCH) in the monitoring occasions.

Certain aspects can be implemented in a method for wireless communication by a network entity (e.g., a base station (BS)). The method generally includes signaling, to a UE, an indication of a dynamic time offset for monitoring occasions of a search space associated with a CORESET, and, based on the dynamic time offset, transmitting a PDCCH in one or more monitoring occasions.

Certain aspects can be implemented in a method for wireless communication by a user equipment (UE). The method generally includes receiving signaling indicating a dynamic frequency offset relative in a frequency allocation of a control resource set (CORESET), and, based on the dynamic frequency offset, monitoring for a physical downlink control channel (PDCCH) in a search space associated with the CORESET.

Certain aspects can be implemented in a method for wireless communication by a network entity (e.g., a base station (BS)). The method generally includes signaling, to a UE, an indication a dynamic frequency offset relative in a frequency allocation of a CORESET, and, based on the dynamic frequency offset, transmitting a PDCCH in a search space associated with the CORESET.

Other aspects provide processing systems configured to perform the aforementioned methods as well as those described herein; non-transitory, computer-readable media comprising instructions that, when executed by one or more processors, cause the one or more processors to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the appended drawings set forth in detail certain illustrative features of the one or more aspects. These features are indicative, however, of but a few of the various ways in which the principles of various aspects may be employed.

BRIEF DESCRIPTION OF THE FIGURES

The appended figures depict certain features of the various aspects described herein and are not to be considered limiting of the scope of this disclosure.

FIGS. 3A-3D depict various example aspects of data structures for a wireless communication network.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide systems and methods for dynamically indicating time (e.g., symbol) and frequency offsets for search spaces associated with control resource sets (CORESETs). A CORESET generally refers to a set of physical resources used to carry physical downlink control channels (PDCCH) that convey downlink control information (DCI). A CORESET is generally analogous to a control region in LTE, but is generalized in the sense that locations of the frequency resources, the set of resource blocks (RBs) and the set of OFDM symbols are configurable with the corresponding PDCCH search spaces.

This ability to configure CORESETs provides flexibility in terms of location of control regions in time and frequency to address a wide range of use cases. In current systems, CORESETs are configured via radio resource control (RRC) signaling, as are the sets of PDCCH candidates (collectively referred to as search spaces). The relatively slow nature of RRC signaling limits how effectively downlink control resources can be adapted to various changing conditions.

Aspects of the present disclosure, however, provide mechanisms for dynamically indicating time offsets (e.g., symbol offsets) and frequency offsets (e.g., RB offsets) for CORESETs that may allow for more flexible and rapid adaptation.

Brief Introduction to Wireless Communication Networks

Figure 1:
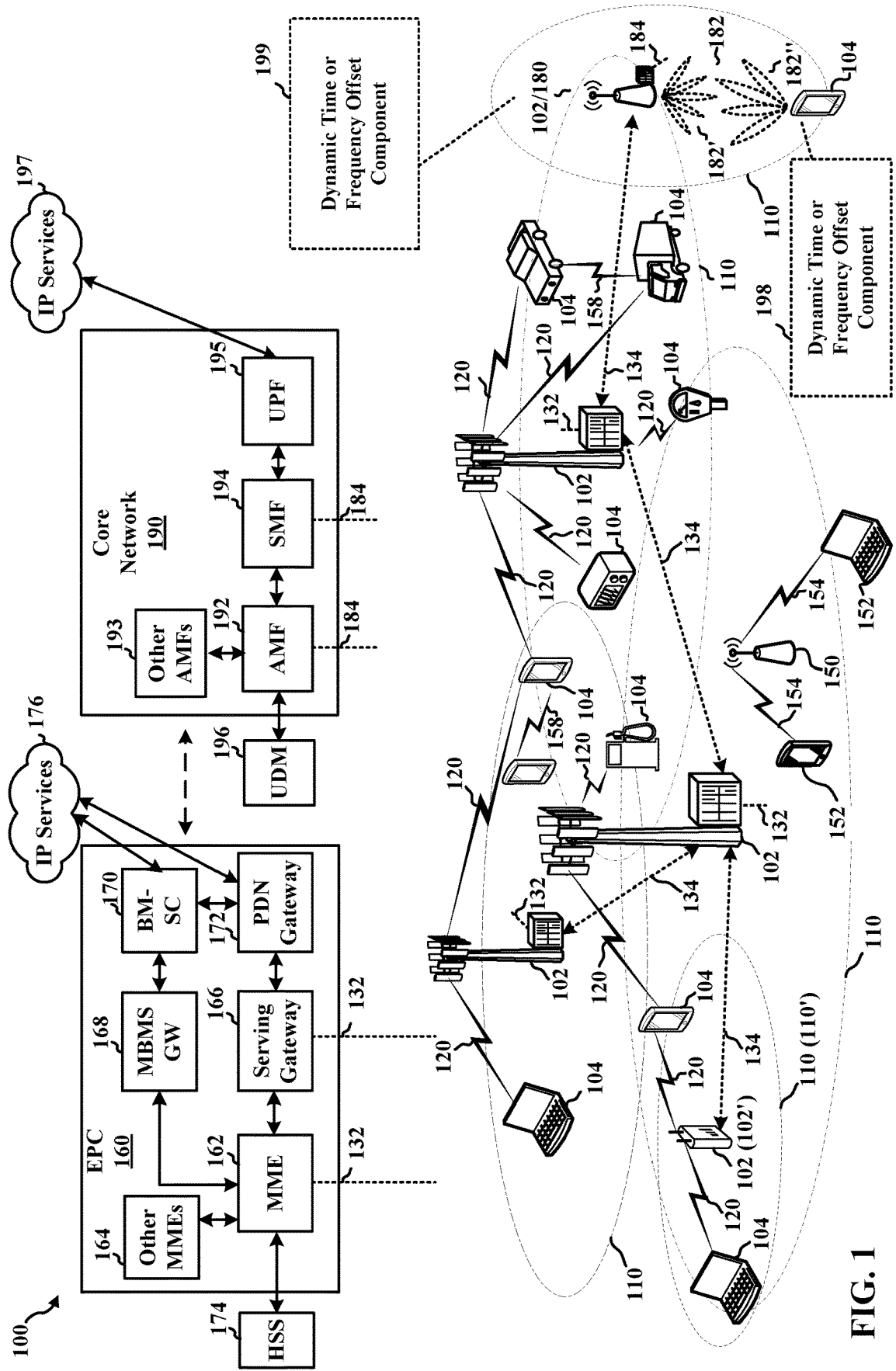
FIG. 1 is a block diagram conceptually illustrating an example wireless communication network, in accordance with certain aspects of the present disclosure.

FIG. 1 depicts an example of a wireless communications system 100, in which aspects described herein may be implemented. While FIG. 1 is briefly introduced here for context, additional aspects of FIG. 1 are described below.

Generally, wireless communications system 100 includes base stations (BSs) 102, user equipments (UEs) 104, an Evolved Packet Core (EPC) 160, and core network 190 (e.g., a 5G Core (5GC)), which interoperate to provide wireless communications services. As used herein, a base station may also be referred to as a network entity.

Base stations 102 may generally provide an access point to the EPC 160 and/or core network 190 for a UE 104, and may generally perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions, including those further described herein. Base stations described herein may include and/or be referred to as a gNB, Node B, eNB, an access point, a base transceiver station, a radio base station, a radio transceiver, or a transceiver function, or a transmit reception point (TRP) in various contexts.

Base stations 102 wirelessly communicate with UEs 104 via communications links 120. Each of base stations 102 may generally provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device (e.g., a smart watch, smart ring, smart bracelet, etc.), a vehicle, an electric meter, a gas pump, a large or small kitchen appliance, a healthcare device, an implant, a sensor/actuator, a display, or any other similar functioning device. Some of UEs 104 may be internet of things (IoT) devices (e.g., parking meter, gas pump, toaster, vehicles, heart monitor, etc.), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 4A:
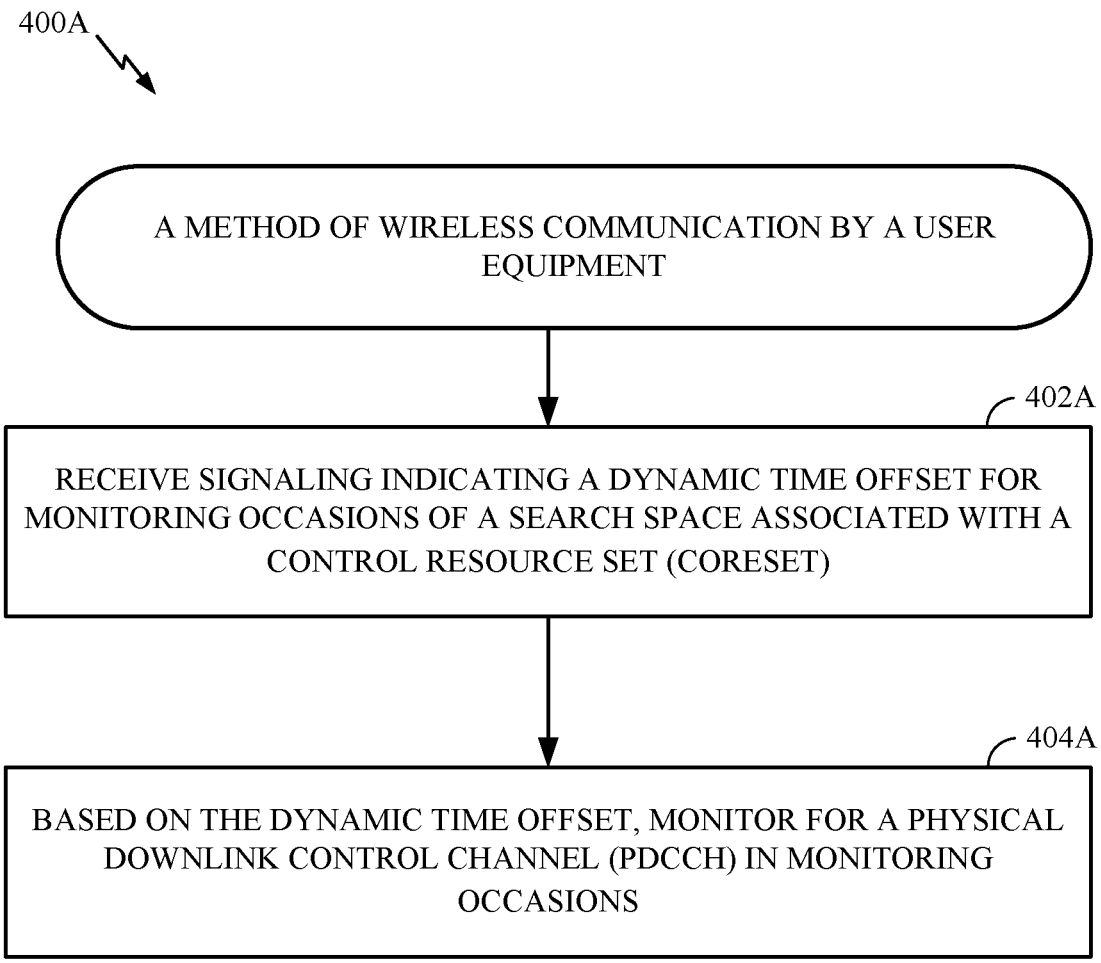
FIG. 4A is a flow diagram illustrating example operations for wireless communication by a user equipment (UE), in accordance with certain aspects of the present disclosure.
Figure 4B:
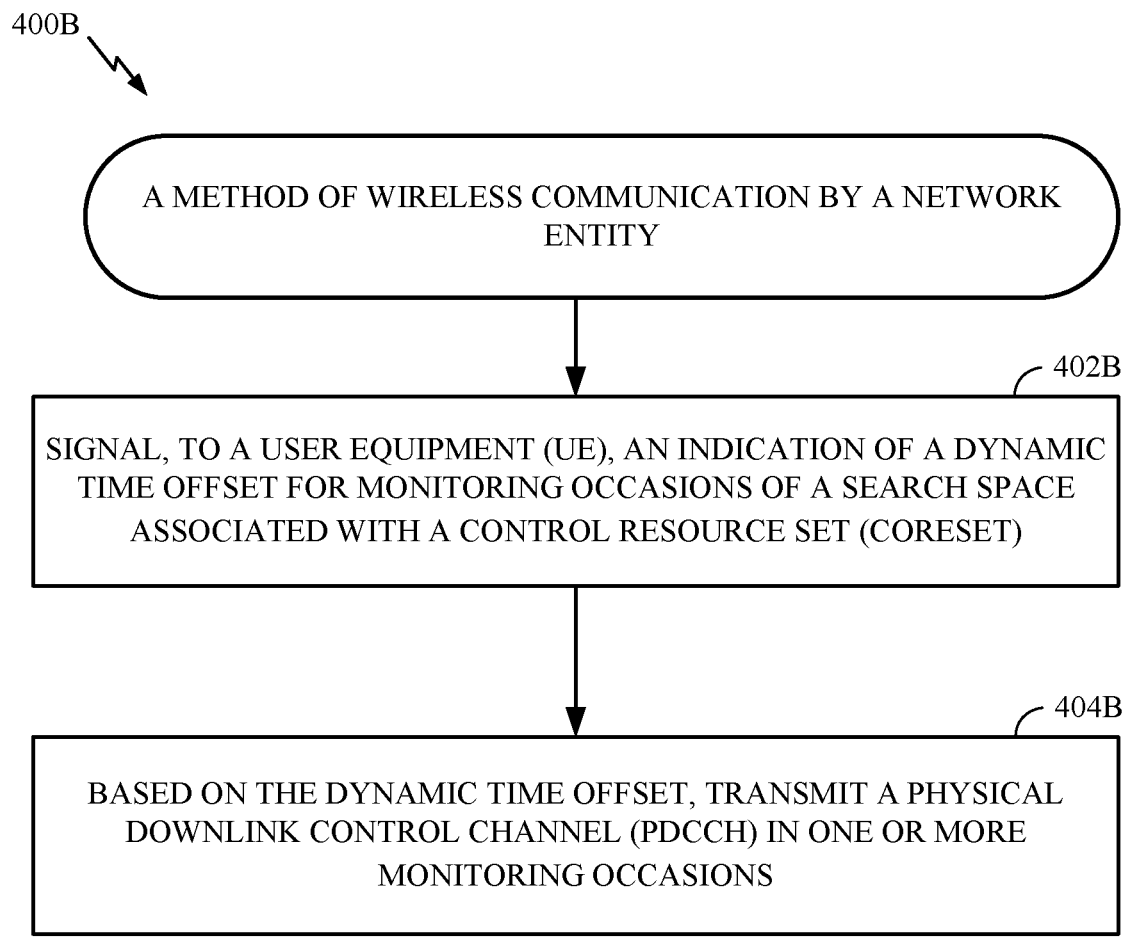
FIG. 4B is a flow diagram illustrating example operations for wireless communication by a network entity, in accordance with certain aspects of the present disclosure.
Figure 7A:
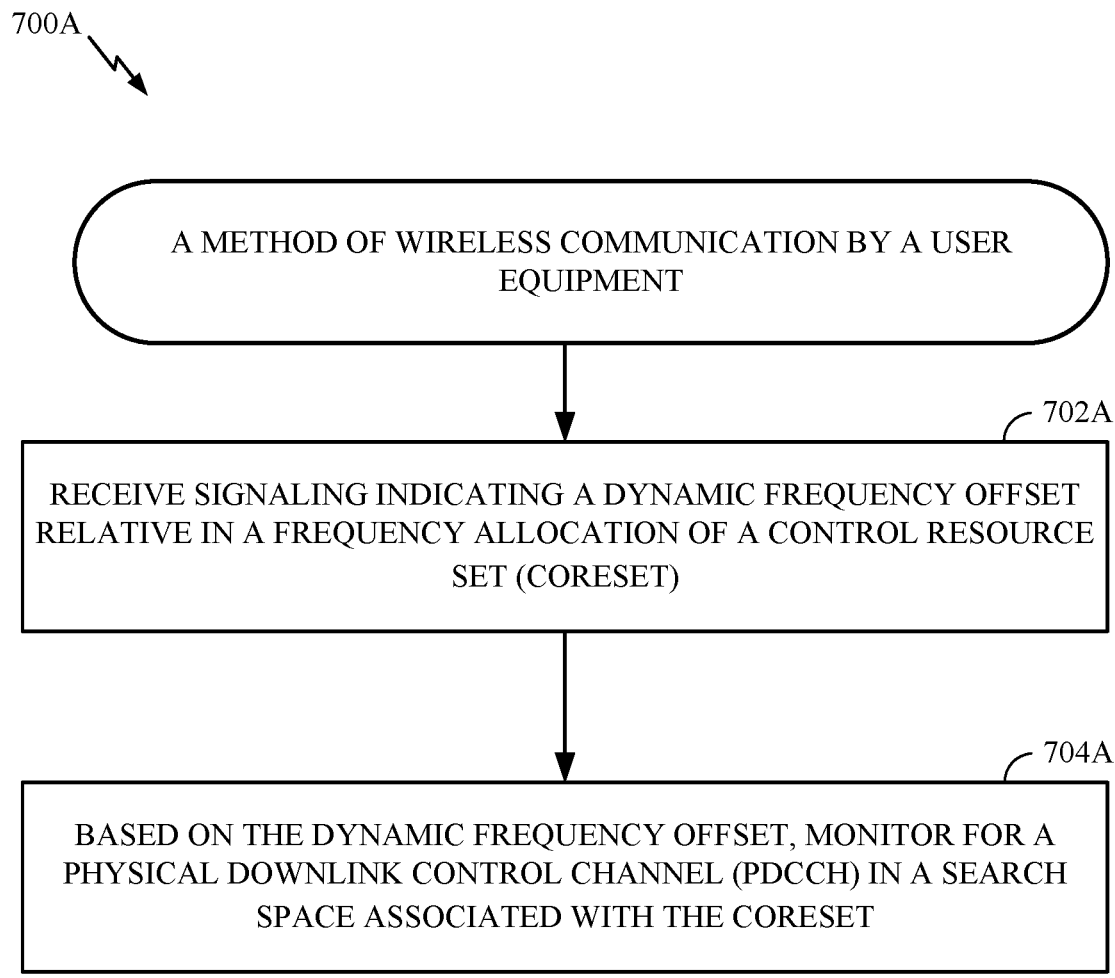
FIG. 7A is a flow diagram illustrating example operations for wireless communication by a UE, in accordance with certain aspects of the present disclosure.
Figure 7B:
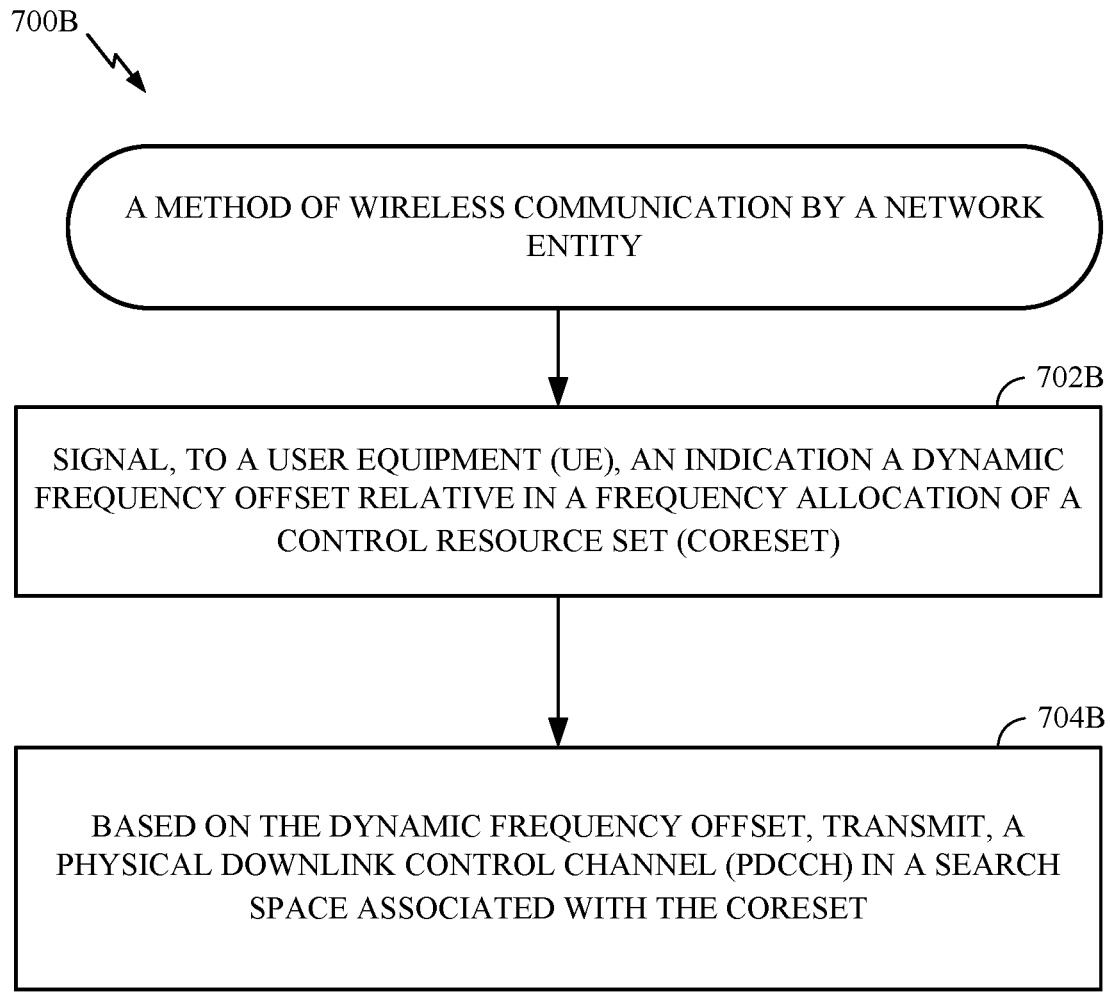
FIG. 7B is a flow diagram illustrating example operations for wireless communication by a network entity, in accordance with certain aspects of the present disclosure.

In some cases, a base station 102 in the wireless communication network 100 may include a dynamic time or frequency offset component 199, which may be configured to perform the operations shown in FIGS. 4B and 7B, as well as other operations described herein for signaling an indication of a dynamic time offset for monitoring occasions of a search space associated with a control resource set (CORESET). Additionally, a UE 104 in the wireless communication network 100 may include a dynamic time or frequency offset component 198, which may be configured to perform the operations depicted and described with respect to FIGS. 4B and 7B, as well as other operations described herein for receiving an indication of a dynamic time offset for monitoring occasions of a search space associated with a CORESET.

Figure 2:
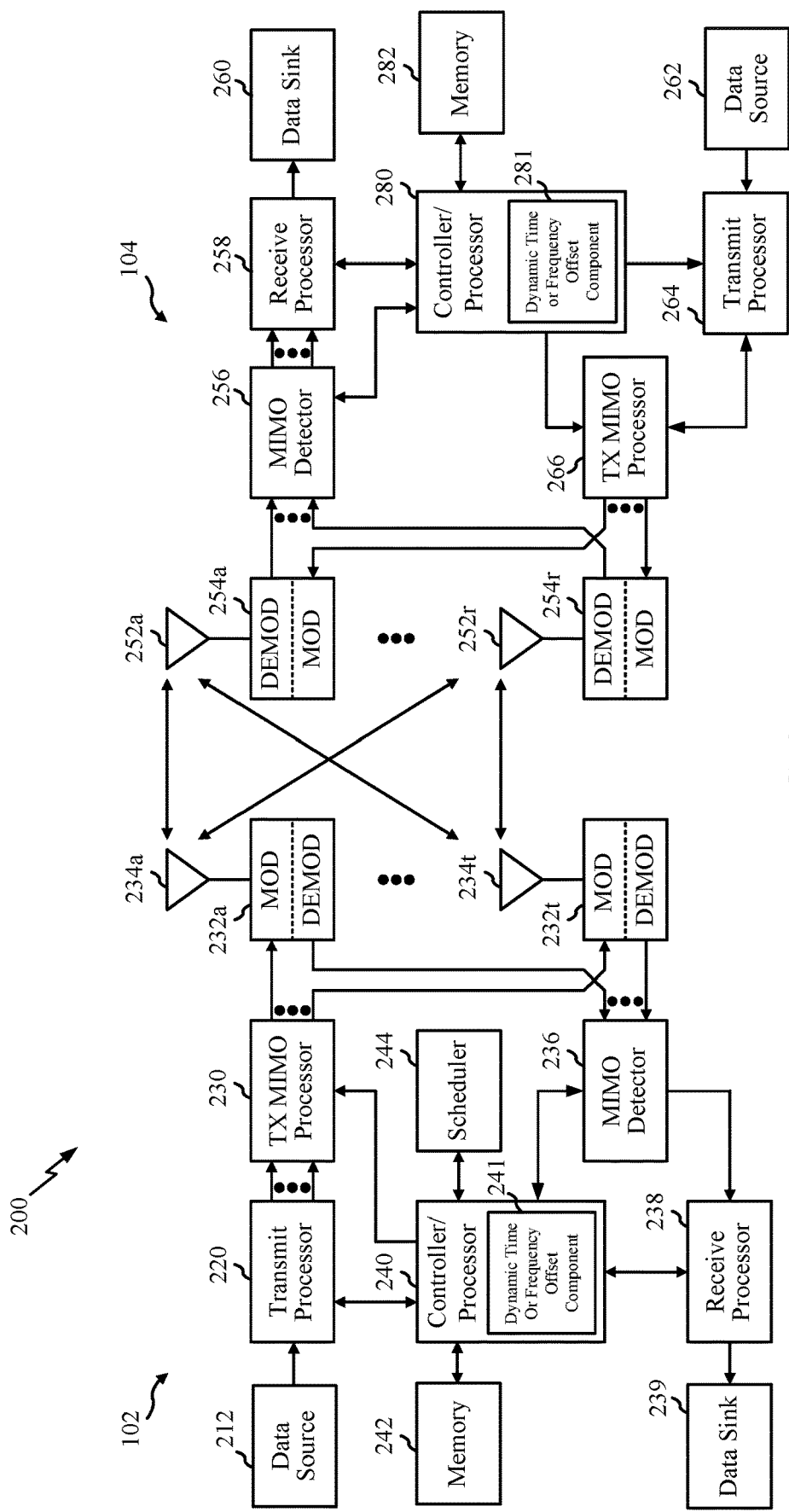
FIG. 2 is a block diagram conceptually illustrating aspects of an example a base station (BS) and user equipment (UE), in accordance with certain aspects of the present disclosure.

FIG. 2 depicts certain example aspects of a base station (BS) 102 and a user equipment (UE) 104. As with FIG. 1, FIG. 2 is briefly introduced here for context and additional aspects of FIG. 2 are described below.

Generally, BS 102 includes various processors (e.g., 220, 230, 238, and 240), antennas 234a-t, transceivers 232a-t, and other aspects, in order to transmit data (e.g., source data 212) and to receive data (e.g., data sink 239). For example, BS 102 may send and receive data between itself and UE 104.

In the depicted example, BS 102 includes controller/processor 240, which comprises a dynamic time or frequency offset component 241. In some cases, the dynamic time or frequency offset component 241 may be configured to implement dynamic time or frequency offset component 199 of FIG. 1 and to perform the operations depicted and described with respect to FIGS. 4B and 7B.

UE 104 generally includes various processors (e.g., 258, 264, 266, and 280), antennas 252a-r, transceivers 254a-r, and other aspects, in order to transmit data (e.g., source data 262) and to receive data (e.g., data sink 260).

In the depicted example, UE 104 includes controller/processor 280, which comprises a dynamic time offset component 281. In some cases, the dynamic time or frequency offset component 281 may be configured to implement the dynamic time or frequency offset component 198 of FIG. 1 and to perform the operations depicted and described with respect to FIGS. 4A and 7A.

FIGS. 3A-3D depict various example aspects of data structures for a wireless communication network, such as wireless communication network 100 of FIG. 1. In particular, FIG. 3A is a diagram 300 illustrating an example of a first subframe within a 5G (e.g., 5G NR) frame structure. FIG. 3B is a diagram 330 illustrating an example of DL channels within a 5G subframe. FIG. 3C is a diagram 350 illustrating an example of a second subframe within a 5G frame structure. FIG. 3D is a diagram 380 illustrating an example of UL channels within a 5G subframe.

Brief Introduction to mmWave Wireless Communications

The electromagnetic spectrum is often subdivided, based on frequency/wavelength, into various classes, bands, channels, etc. In various aspects, a frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmW/near mmW radio frequency band (e.g., 3 GHz-300 GHz) may have higher path loss and a shorter range compared to lower frequency communications. Accordingly, in FIG. 1, mmW base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Example Indicating Dynamic Time Offsets for Search Spaces

In general, dynamic changes in downlink (DL) control resources and/or physical downlink control channel (PDCCH) candidates can improve reliability of fifth generation (5G) wireless systems. As noted above, in current systems (e.g., NR Rel-15), a DL control resource set (CORESET) is configured by radio resource control (RRC) signaling, and corresponding sets of PDCCH candidates (e.g., collectively referred to as "search spaces" within the CORESET) are also configured by RRC signaling.

Some proposals have been made for changing CORESETs and/or search spaces in a more dynamic fashion by switching among different preconfigured (e.g., statically configured) options. In some instances (e.g., in the unlicensed spectrum of NR), the CORESET configuration may include a resource block (RB) offset, where the signaling is per band but only expected for a band where shared spectrum channel access must be used. In other words, the RB offset is part of a static configuration.

However, this raises the issue of not having as flexible and/or dynamic adaptation of DL control resources. For example, flexible and/or dynamic adaptation of DL control resources may be desired in cases of a changing system frame number (SFN) and/or slot format indicator (SFI). Similarly, dynamic or flexible DL control resource adaptation may be help in avoiding collisions with other signals (e.g., with a synchronization signal block (SSB)). The potential for collision increases, for example, as the number of (potentially overlapping) cells in a system increases.

Aspects of the present disclosure, however, provide mechanisms for dynamically indicating time offsets (e.g., symbol offsets) for search spaces associated with CORESETs that may allow for more flexible and rapid adaptation.

According to certain aspects, a user equipment (UE) may signal (e.g., to a network entity) an indication that the UE supports dynamic time offsets (e.g., dynamic orthogonal frequency division multiplexed (OFDM) symbol offsets). The UE may then receive signaling that indicates a dynamic time offset relative for monitoring occasions of a search space associated with a CORESET (e.g., a preconfigured CORESET). The UE may then monitor for a PDCCH in the monitoring occasions based on the indicated dynamic time offset. Thus, in some cases, the dynamic time offset may not merely be a preconfigured (e.g., static or semi-static) indication, but allow for the UE to monitor in the appropriate monitoring occasions in a more dynamic fashion.

FIG. 4A is a flow diagram illustrating example operations 400A for wireless communication, in accordance with certain aspects of the present disclosure.

The operations 400A may be performed, for example, by a UE (e.g., such as the UE 104 in the wireless communication network 100) for receiving dynamic indications of time offset(s) for CORESETS. The operations 400A may be implemented as software components that are executed and run on one or more processors (e.g., controller/processor 280 of FIG. 2). Further, the transmission and reception of signals by the UE in operations 400A may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400A begin, at 402A, by receiving signaling indicating a dynamic time offset for monitoring occasions of a search space associated with a CORESET.

As used herein, the term monitoring occasion generally refers to a time period in which PDCCH transmissions may occur. To conserve processing power, a UE only monitors certain occasions in which a PDCCH intended for it may occur. Because the UE and base station are in synch regarding the monitoring occasions, the base station can transmit PDCCH to a UE in occasions that UE is monitoring.

The dynamic time offset may be indicated, for example, as a dynamic orthogonal frequency division multiplexed (OFDM) symbol offset (a time value in resolution of OFDM symbol durations). In some examples, the dynamic time offset is indicated as an explicit number, or as an index referring to one of a predefined or preconfigured set of numbers.

At block 404A, the UE, based on the dynamic time offset, monitors for a PDCCH in the monitoring occasions. In other words, the UE may apply the dynamically indicated time offset to determine what PDCCH occasions to monitor.

FIG. 4B is a flow diagram illustrating example operations 400B that may be considered complementary to operations 400A of FIG. 4A. For example, operations 400B may be performed by a network entity (e.g., such as the BS 102 in the wireless communication network 100) for dynamically indicating time offset(s) for PDCCH monitoring occasions of search spaces associated with CORESETS to a UE performing operations 400A of FIG. 4A. The operations 400B may be implemented as software components that are executed and run on one or more processors (e.g., controller/processor 240 of FIG. 2). Further, the transmission and reception of signals by the BS in operations 400B may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 400B begin, at 402B, by signaling, to a UE, an indication of a dynamic time offset for monitoring occasions of a search space associated with a CORESET.

At 404B, the network entity, based on the dynamic time offset, transmits a PDCCH in one or more monitoring occasions.

In some cases, the operations 400B may further include receiving an indication of a capability of the UE to support dynamic time offsets, and signaling the indication of the dynamic time offset in response to receiving the indication of the capability of the UE to support dynamic time offsets. In this case, the indication may be received during a random access channel (RACH) procedure or after establishing a radio resource control (RRC) connection.

Figure 5:
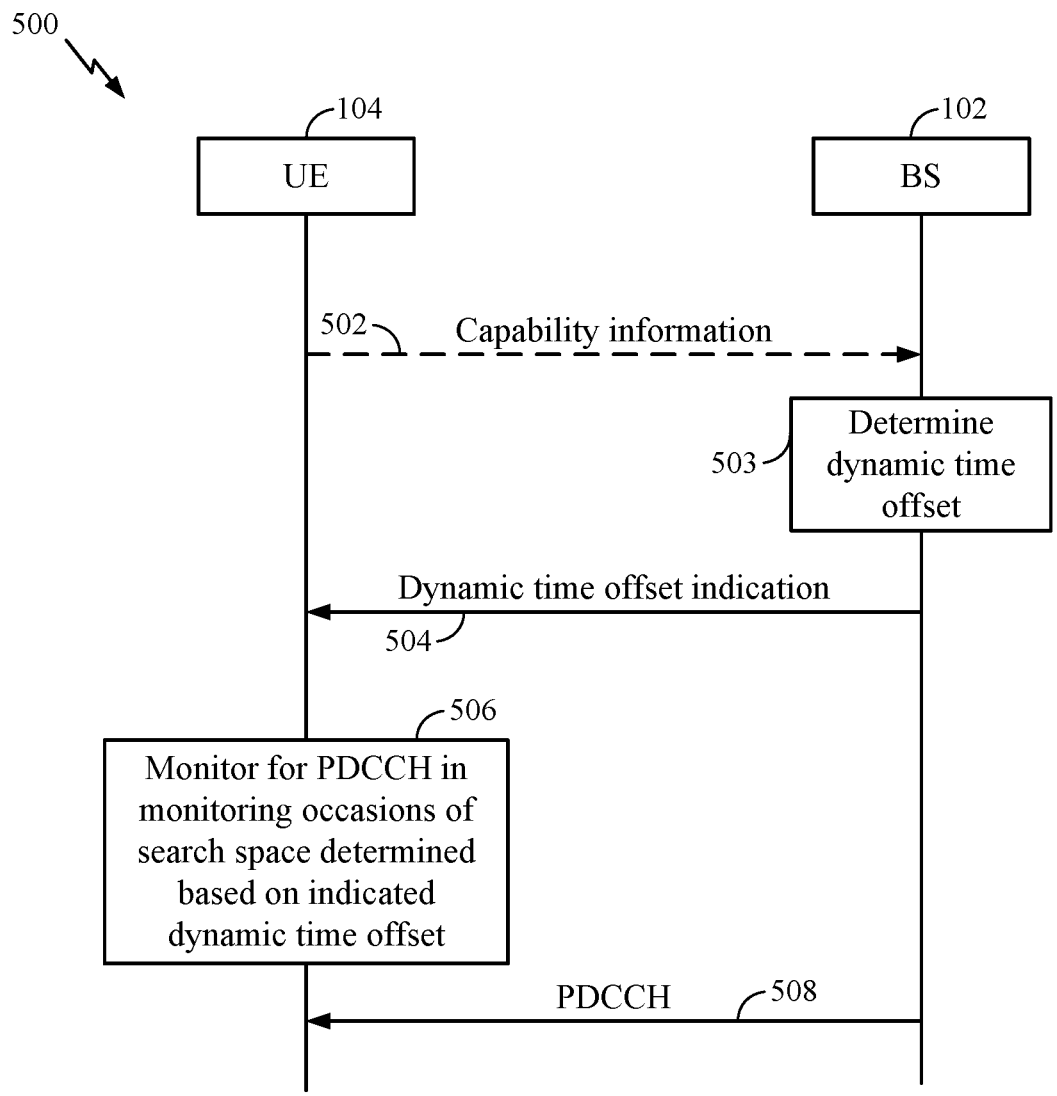
FIG. 5 is an example call flow diagram illustrating example operations for wireless communication between the UE and the BS, in accordance with certain aspects of the present disclosure.

Example Information Flow Between a Base Station and User Equipment for Indicating Time Offsets for CORESETs Operations 400A and 400B of FIGS. 4A and 4B may be understood with reference to the example call flow diagram 500 of FIG. 5. Call flow diagram 500 illustrates operations performed by a UE (e.g., UE 104 in the wireless communication network 100 performing operations 400A of FIG. 4A) and a BS (e.g., BS 102 in the wireless communication network 100 performing operations 400B of FIG. 4B) for dynamically indicating time offsets for PDCCH monitoring occasions of search spaces associated with a configured CORESET.

As shown, at 502, the UE 104 may optionally indicate capability information to the BS 102 (e.g., as indicated by the dashed line). That is, the UE 104 may indicate a capability to support dynamic time offsets. In some cases, absent this capability information, the BS 102 may assume the UE does not support dynamic time offsets and will maintain conventional (RRC) time offset configuration.

As shown at block 503, the BS 104 determines the dynamic time offset. In some cases, the determination at block 503 (and use of dynamic offset signaling in general) may be conditioned on the capability information sent at 502, while in other cases the determination may be made absent the capability information sent at 502. In other words, if no capability information is sent from the UE 104, the BS 102 may determine to signal a default time offset (e.g., via RRC signaled CORESET configuration). In some cases, the BS 104 may use standard specification information in conjunction with the capability information sent at 502 to determine the dynamic time offset.

As shown, at 504, the BS 102 transmits the dynamic time offset indication to the UE 104. As shown, at 506, the UE 104 monitors for a physical downlink control channel (PDCCH) 508 in a search space determined based on the indicated dynamic time offset.

Figure 6:
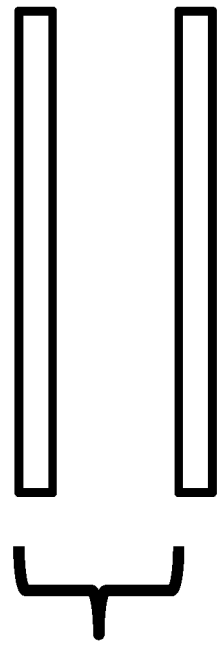
FIG. 6 is an example illustration of search space resources offset being based on an indicated symbol offset, in accordance with certain aspects of the present disclosure.

In some cases, the dynamic time offset may be indicated via a downlink medium access control (MAC) control element (CE) or a group-common or UE-specific downlink control information (DCI). The dynamic time offset may be relative to a (preconfigured) time resource allocation of a CORESET. For example, as shown in FIG. 6, the dynamic time offset for the monitoring occasions may be indicated by a dynamic symbol offset.

Additional Details for Indicating RB Offsets for CORESETs

As noted above, aspects of the present disclosure provide techniques for indicating dynamic time offset(s) for monitoring occasions of search spaces. According to aspects, a dynamic time offset may be indicated in a number of manners.

For example, the dynamic time offset may be indicated as a dynamic orthogonal frequency division multiplexed (OFDM) symbol offset, an explicit number, and/or as an index referring to one of a predefined or preconfigured set of numbers. For example, the UE may be preconfigured with the set of numbers via RRC signaling (each number representing a different time/symbol offset value), while the actual time offset may be dynamically indicated (via DCI or MAC-CE) as an index pointing to one of the numbers in the set.

In some cases, the dynamic time offset is indicated via a downlink medium access control (MAC) control element (CE) and/or via a group-common or UE-specific downlink control information (DCI). In certain aspects, the dynamic time offset is indicated for a CORESET associated with at least one of common search spaces or UE-specific search spaces. In some cases, the UE applies the dynamic time offset depending on at least one of a frequency range or subcarrier spacing.

As described above with respect to FIG. 5, the UE may signal an indication of a capability of the UE to support dynamic time offsets. In this case, the indication may be provided during a random access channel (RACH) procedure and/or after establishing a radio resource control (RRC) connection.

Example Indicating Frequency Offsets for CORESETs

In general, dynamic changes in downlink (DL) control resources and/or physical downlink control channel (PDCCH) candidates can improve reliability of fifth generation (5G) wireless systems. As noted above, in current systems (e.g., NR Rel-15), a DL control resource set (CORESET) is configured by radio resource control (RRC) signaling, and corresponding sets of PDCCH candidates (e.g., collectively referred to as "search spaces" within the CORESET) are also configured by RRC signaling.

Some proposals have been made for changing CORESETs and/or search spaces in a more dynamic fashion by switching among different preconfigured (e.g., statically configured) options. In some instances (e.g., in the unlicensed spectrum of NR), the CORESET configuration may include a resource block (RB) offset, where the signaling is per band but only expected for a band where shared spectrum channel access must be used. In other words, the RB offset is part of a static configuration.

However, this raises the issue of not having as flexible and/or dynamic adaptation of DL control resources. For example, flexible and/or dynamic adaptation of DL control resources may be desired in cases of a changing system frame number (SFN) and/or slot format indicator (SFI). Similarly, dynamic or flexible DL control resource adaptation may be help in avoiding collisions with other signals (e.g., with a synchronization signal block (SSB)). The potential for collision increases, for example, as the number of (potentially overlapping) cells in a system increases.

Aspects of the present disclosure, however, provide mechanisms for dynamically indicating frequency offsets (e.g., RB offsets) for CORESETs that may allow for more flexible and rapid adaptation.

According to certain aspects, a user equipment (UE) may signal (e.g., to a network entity) an indication that the UE supports dynamic frequency offsets (e.g., dynamic RB offsets). The UE may then receive signaling that indicates a dynamic RB offset relative to a frequency allocation in a CORESET (e.g., a preconfigured CORESET). The UE may then, based on the indicated dynamic frequency offset, monitor for a PDCCH in a search space associated with the CORESET. Thus, a dynamic frequency/RB offset may provide greater flexibility than that afforded by a preconfigured (e.g., static or semi-static) indication, while still allowing a UE to quickly determine the appropriate search space to monitor in a more dynamic fashion.

FIG. 7A is a flow diagram illustrating example operations 400 for wireless communication, in accordance with certain aspects of the present disclosure.

The operations 700A may be performed, for example, by a UE (e.g., such as the UE 104 in the wireless communication network 100) for receiving dynamic indications of RB offset(s) for CORESETS. The operations 700A may be implemented as software components that are executed and run on one or more processors (e.g., controller/processor 280 of FIG. 2). Further, the transmission and reception of signals by the UE in operations 400A may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700A begin, at 702A, by receiving signaling indicating a dynamic frequency offset relative in a frequency allocation of a CORESET. For example, the dynamic frequency offset may be indicated as a dynamic RB offset. In this case, the dynamic RB offset may be indicated as a multiple of an integer (e.g., 6). In some examples, the dynamic frequency offset is indicated as an index referring to one of a predefined or preconfigured set of numbers.

At block 704A, the UE, based on the dynamic frequency offset, monitors for a physical downlink control channel (PDCCH) in a search space associated with the CORESET.

FIG. 7B is a flow diagram illustrating example operations 700B that may be considered complementary to operations 700A of FIG. 7A. For example, operations 700B may be performed by a network entity (e.g., such as the BS 102 in the wireless communication network 100) for dynamically indicating RB offset(s) for CORESETS to a UE performing operations 700A of FIG. 7A. The operations 700B may be implemented as software components that are executed and run on one or more processors (e.g., controller/processor 240 of FIG. 2). Further, the transmission and reception of signals by the BS in operations 700B may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 700B begin, at 702B, by signaling, to a UE, an indication a dynamic frequency offset relative in a frequency allocation of a CORESET.

At 704B, the network entity, based on the dynamic frequency offset, transmits a PDCCH in a search space associated with the CORESET.

In some cases, the operations 700B may further include receiving an indication of a capability of the UE to support dynamic frequency offsets, and signaling the indication of the dynamic frequency offset in response to receiving the indication of the capability of the UE to support dynamic frequency offsets. In this case, the indication may be received during a random access channel (RACH) procedure or after establishing a radio resource control (RRC) connection.

Figure 8:
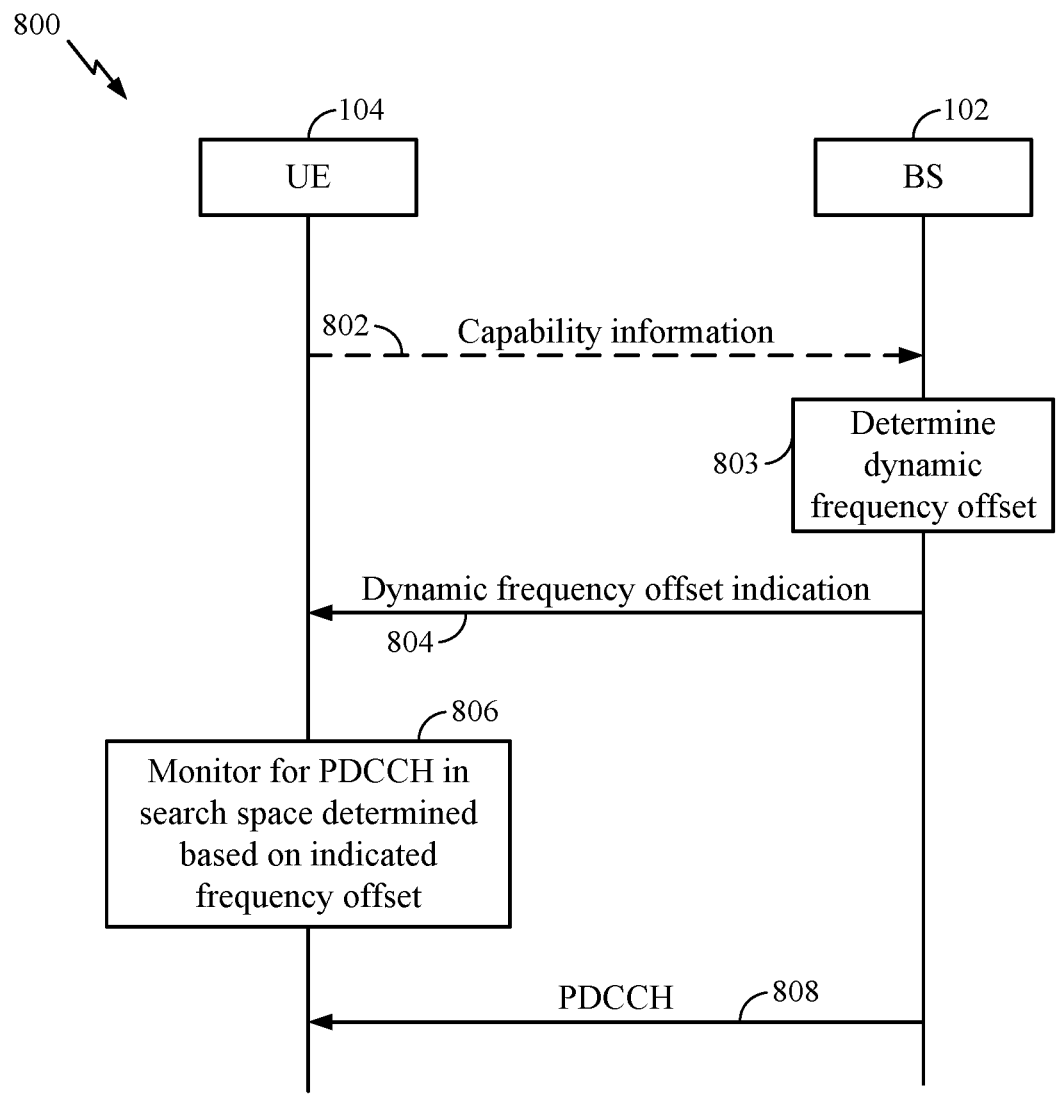
FIG. 8 is an example call flow diagram illustrating example operations for wireless communication between the UE and the BS, in accordance with certain aspects of the present disclosure.

Example Information Flow Between a Base Station and User Equipment for Indicating Frequency Offsets for CORESETs Operations 700A and 700B of FIGS. 7A and 7B may be understood with reference to the example call flow diagram 800 of FIG. 8. Call flow diagram 800 illustrates operations performed by a UE (e.g., UE 104 in the wireless communication network 100 performing operations 700A of FIG. 7A) and a BS (e.g., BS 102 in the wireless communication network 100 performing operations 700B of FIG. 7B) for dynamically indicating RB offset(s) in a frequency allocation in CORESETS.

As shown, at 802, the UE 104 may optionally indicate capability information to the BS 102 (e.g., as indicated by the dashed line), indicating a capability to support dynamic frequency offsets. In some cases, absent this capability information, the BS 102 may assume the UE does not support dynamic frequency offsets and will maintain conventional (RRC) frequency offset configuration.

As shown at block 803, the BS 104 determines the dynamic frequency offset. As noted above, the determination at block 803 may be conditioned on the capability information sent at 802. In other words, if no capability information is sent from the UE 104, the BS 102 may determine to signal a default frequency offset (e.g., via RRC). In some cases, the BS 104 may use standard specification information in conjunction with the capability information sent at 802 to determine the dynamic frequency offset.

As shown, at 804, the BS 102 transmits the dynamic frequency offset indication to the UE 104. For example, the dynamic frequency offset may be indicated via a downlink medium access control (MAC) control element (CE) or a group-common or UE-specific downlink control information (DCI).

As shown, at 806, the UE 104, based on a search space determined by the indicated dynamic frequency offset, monitors for a physical downlink control channel (PDCCH) 808 in the search space. In other words, based on the (dynamically indicated) CORESET location, the UE 104 may determine the PDCCH search space based on a determined association.

Figure 9:
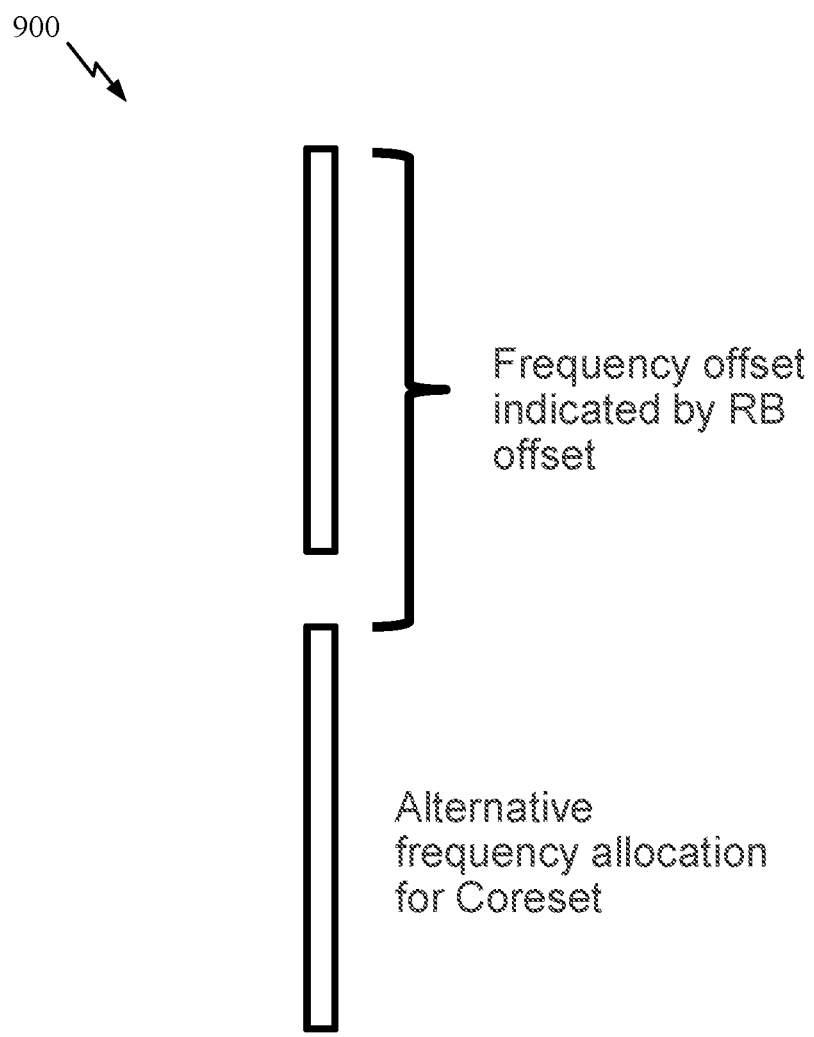
FIG. 9 is an example illustration of search space resources offset based on an indicated resource block (RB) offset, in accordance with certain aspects of the present disclosure.

The indicated dynamic frequency offset may be relative in a (preconfigured) frequency resource allocation of a CORESET. For example, as shown in FIG. 9, the dynamic frequency offset may be indicated by an RB offset (in terms of a number of RBs) relative to some alternative frequency allocation for the CORESET.

Additional Details for Indicating Frequency Offsets for CORESETs

As noted above, aspects of the present disclosure provide techniques for dynamically indicating frequency (RB) offset(s) for CORESETS. According to aspects, a dynamic frequency offset may be indicated in a number of manners.

For example, the dynamic frequency offset may be indicated as a dynamic RB offset (which may be indicated as a multiple of an integer number), an explicit number, and/or as an index referring to one of a predefined or preconfigured set of numbers. For example, the UE may be preconfigured with the set of numbers via RRC signaling (each number representing a different frequency offset value), while the frequency offset may be dynamically indicated (via DCI or MAC-CE) as an index pointing to one of the numbers in the set.

In some cases, when the dynamic frequency offset may be indicated as a multiple of an integer number. For example, the integer number may be 6 because the frequency allocation of a CORESET is typically specified in a multiples of 6 RBs. However, it should be appreciated that the integer multiple could also be any suitable number other than six.

As noted above, the dynamic frequency offset may be indicated via a downlink medium access control (MAC) control element (CE) and/or via a group-common or UE-specific downlink control information (DCI). In certain aspects, the dynamic frequency offset is indicated for a CORESET associated with at least one of common search spaces or UE-specific search spaces. In some cases, the UE applies the dynamic frequency offset depending on at least one of a frequency range or subcarrier spacing.

As described above with respect to FIG. 8, the UE may signal an indication of a capability of the UE to support dynamic frequency offsets. For example, the capability indication may be provided during a random access channel (RACH) procedure and/or after establishing an RRC connection.

Example Wireless Communication Devices

Figure 10:
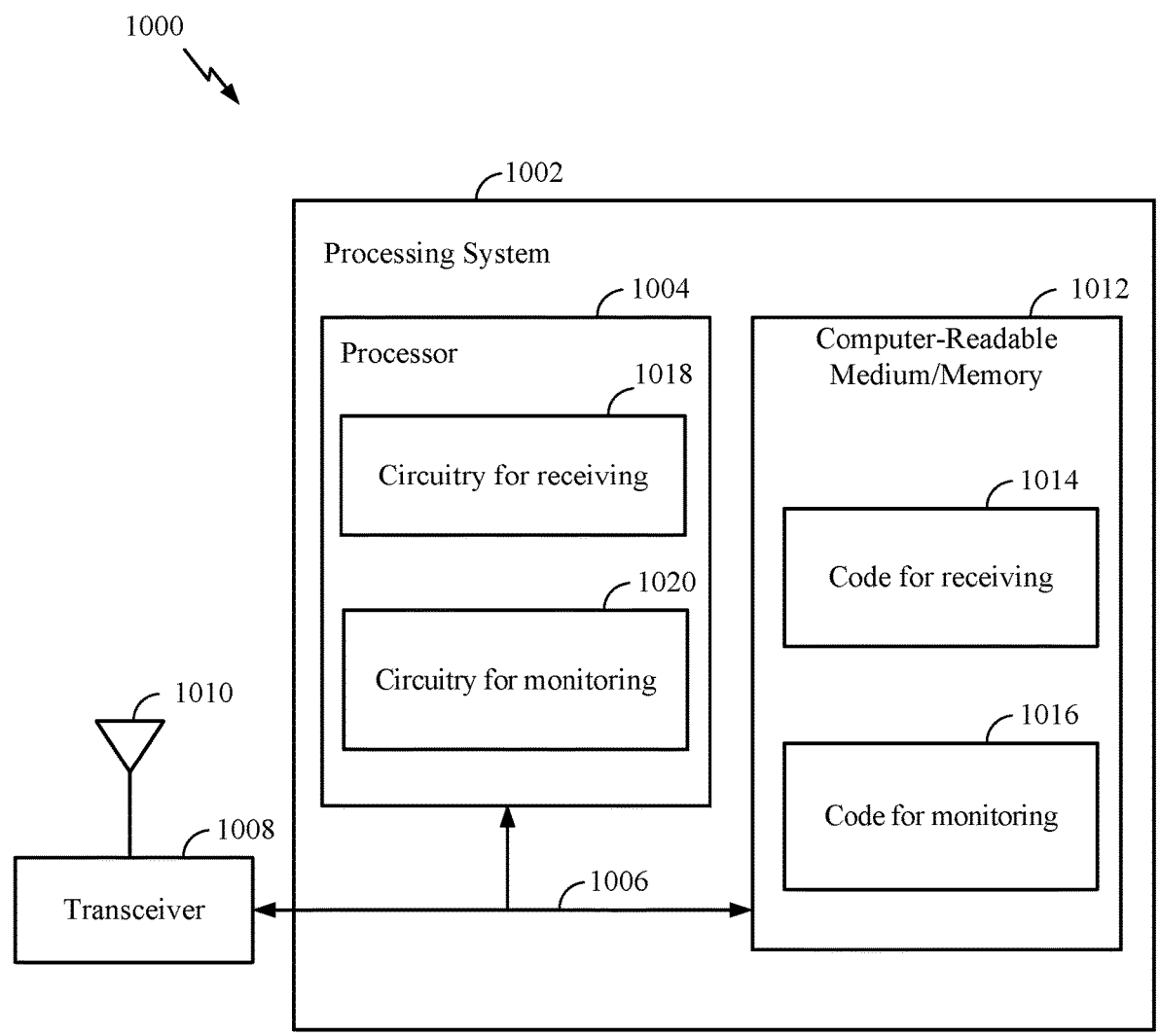
FIG. 10 illustrates an example wireless communications device configured to perform operations for the methods disclosed herein, in accordance with certain aspects of the present disclosure.

FIG. 10 illustrates a communications device 1000 that may include various components (e.g., corresponding to means-plus-function components) configured to perform operations for the techniques disclosed herein, such as the operations illustrated in FIGS. 4A and 7A. In some cases, the communications device 1000 may include the UE 104 illustrated in FIG. 1 and FIG. 2.

Communications device 1000 includes a processing system 1002 coupled to a transceiver 1008 (e.g., a transmitter and/or a receiver). Transceiver 1008 is configured to transmit and receive signals for the communications device 1000 via an antenna 1010, such as the various signals as described herein. Processing system 1002 may be configured to perform processing functions for communications device 1000, including processing signals received and/or to be transmitted by communications device 1000. The transceiver 1008 can include one or more components of UE 104 with reference to FIG. 2 such as, for example, transceiver 254, TX MIMO processor 266, transmit processor 264, receive processor 258, MIMO detector 256, and/or the like.

Processing system 1002 includes a processor 1004 coupled to a computer-readable medium/memory 1012 via a bus 1006. In certain aspects, computer-readable medium/memory 1012 is configured to store instructions (e.g., computer-executable code) that when executed by processor 1004, cause processor 1004 to perform the operations illustrated in FIGS. 4A and 7A, and/or other operations for performing the various techniques discussed herein for receiving an indication of a dynamic time or frequency offset for monitoring occasions of a search space associated with a CORESET. In some cases, the processor 1004 can include one or more components of UE 104 with reference to FIG. 2 such as, for example, controller/processor 280 (including the dynamic time offset component 281), transmit processor 264, receive processor 258, and/or the like. Additionally, in some cases, the computer-readable medium/memory 1012 can include one or more components of UE 104 with reference to FIG. 2 such as, for example, memory 282 and/or the like.

In certain aspects, computer-readable medium/memory 1012 stores code 1014 for receiving and code 1016 for monitoring.

In some cases, the code 1014 for receiving may include code for receiving signaling indicating a dynamic time or frequency offset for monitoring occasions of a search space associated with a control resource set (CORESET).

In some cases, the code 1016 for monitoring may include code for, based on the dynamic time or frequency offset, monitoring for a physical downlink control channel (PDCCH) in monitoring occasions.

In certain aspects, processor 1004 has circuitry configured to implement the code stored in the computer-readable medium/memory 1012. For example, processor 1004 includes circuitry 1018 for receiving and circuitry 1020 for monitoring.

In some cases, the circuitry 1018 for receiving may include circuitry for receiving signaling indicating a dynamic time or frequency offset for monitoring occasions of a search space associated with a CORESET.

In some cases, the circuitry 1020 for monitoring may include circuitry for, based on the dynamic time or frequency offset, monitoring for a PDCCH in monitoring occasions.

In some examples, means for receiving may include the receiver and/or antenna(s) 252 of the UE 104 illustrated in FIG. 2 and/or circuitry 1018 for receiving of the communication device 1000 in FIG. 10.

In some examples, means for monitoring may include the receiver and/or antenna(s) 252 of the UE 104 illustrated in FIG. 2 and/or circuitry 1020 for receiving of the communication device 1000 in FIG. 10.

Figure 11:
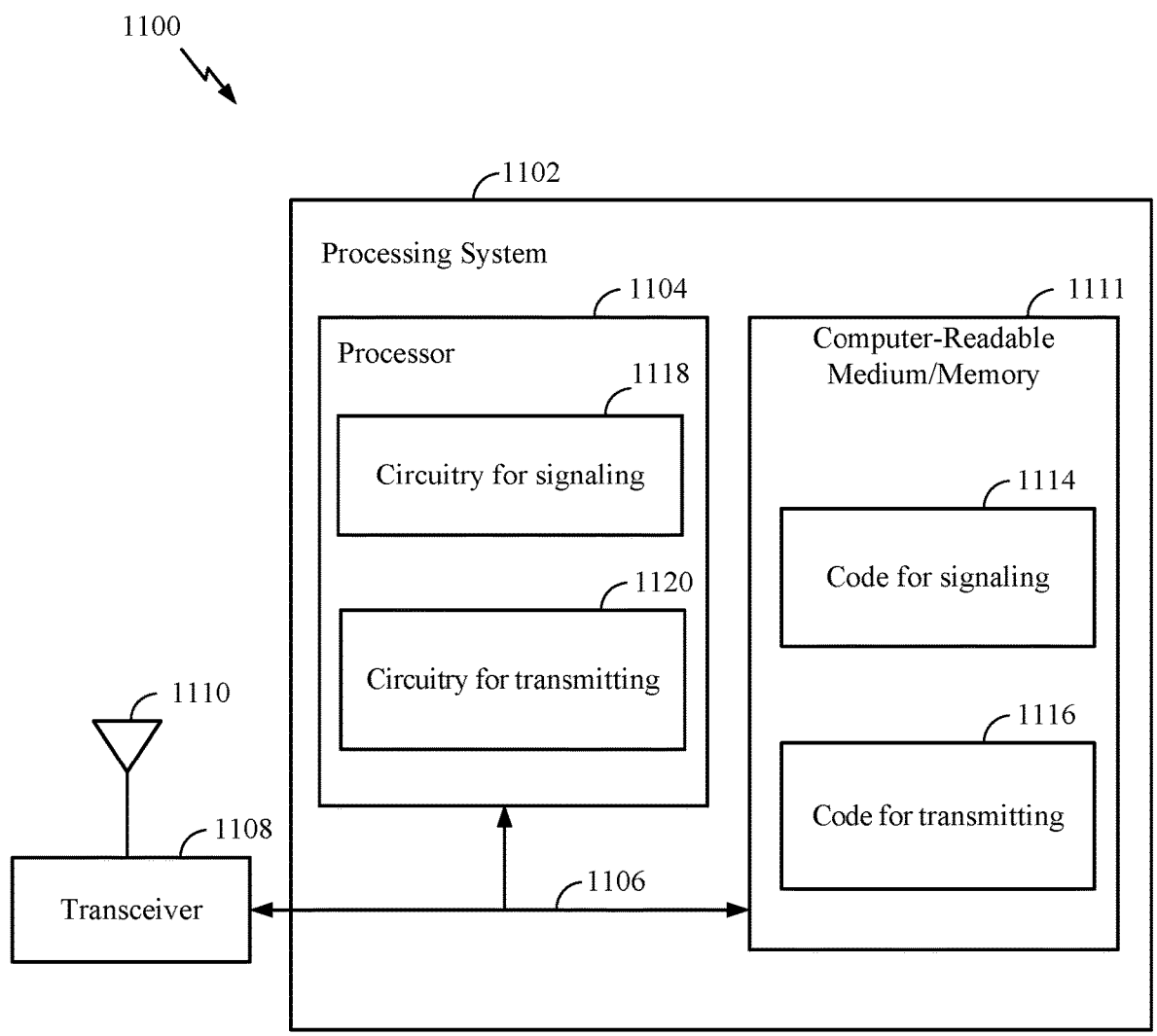
FIG. 11 illustrates an example wireless communications device configured to perform operations for the methods disclosed herein, in accordance with certain aspects of the present disclosure.

FIG. 11 illustrates a communications device 1100 that may include various components (e.g., corresponding to means-plus-function components) configured to perform operations for the techniques disclosed herein, such as the operations illustrated in FIGS. 4B and 7B. In some cases, the communications device 1100 may include the BS 102 illustrated in FIG. 1 and FIG. 2.

Communications device 1100 includes a processing system 1102 coupled to a transceiver 1108 (e.g., a transmitter and/or a receiver). Transceiver 1108 is configured to transmit and receive signals for the communications device 1100 via an antenna 1110, such as the various signals as described herein. Processing system 1102 may be configured to perform processing functions for communications device 1100, including processing signals received and/or to be transmitted by communications device 1100. The transceiver 1108 can include one or more components of BS 102 with reference to FIG. 2 such as, for example, transceiver 232, TX MIMO processor 230, transmit processor 220, receive processor 238, MIMO detector 236, and/or the like.

Processing system 1102 includes a processor 1104 coupled to a computer-readable medium/memory 1112 via a bus 1106. In certain aspects, computer-readable medium/memory 1112 is configured to store instructions (e.g., computer-executable code) that when executed by processor 1104, cause processor 1104 to perform the operations illustrated in FIGS. 4B and 7B, or other operations for performing the various techniques discussed herein for providing an indication of a dynamic time or frequency offset for monitoring occasions of a search space associated with a CORESET. In some cases, the processor 1104 can include one or more components of BS 102 with reference to FIG. 2 such as, for example, controller/processor 240 (including the dynamic time offset component 241), transmit processor 220, receive processor 238, and/or the like. Additionally, in some cases, the computer-readable medium/memory 1112 can include one or more components of BS 102 with reference to FIG. 2 such as, for example, memory 242 and/or the like.

In certain aspects, computer-readable medium/memory 1112 stores code 1114 for signaling and code 1116 for transmitting.

In some cases, the code 1114 for signaling may include code for signaling, to a UE, an indication of a dynamic time or frequency offset for monitoring occasions of a search space associated with a CORESET.

In some cases, the code 1116 for transmitting may include code for, based on the dynamic time or frequency offset, transmitting a PDCCH in a search space associated with the CORESET.

In certain aspects, processor 1104 has circuitry configured to implement the code stored in the computer-readable medium/memory 1112. For example, processor 1104 includes circuitry 1118 for signaling and circuitry 1120 for transmitting.

In some cases, the circuitry 1124 for receiving may include circuitry for signaling, to a UE, an indication of a dynamic time or frequency offset for monitoring occasions of a search space associated with a CORESET.

In some cases, the circuitry 1126 for, based on the dynamic time or frequency offset, transmitting may include circuitry for transmitting a PDCCH in a search space associated with the CORESET.

In some examples, means for transmitting (or means for outputting for transmission) may include a transmitter and/or an antenna(s) 234 or the BS 102 illustrated in FIG. 2 and/or circuitry 1120 for transmitting of the communication device 1100 in FIG. 11.

In some examples, means for signaling may include a receiver and/or an antenna(s) 234 of the BS 102 illustrated in FIG. 2 and/or circuitry 1118 for signaling of the communication device 1100 in FIG. 11.

EXAMPLE CLAUSES

Implementation examples are described in the following numbered clauses:

Clause 1: A method for wireless communications by a user equipment (UE), comprising receiving signaling indicating a dynamic time offset for monitoring occasions of a search space associated with a control resource set (CORESET); and, based on the dynamic time offset, monitoring for a physical downlink control channel (PDCCH) in monitoring occasions.

Clause 2: The method of Clause 1, wherein the dynamic time offset is indicated as a dynamic orthogonal frequency division multiplexed (OFDM) symbol offset.

Clause 3: The method of Clause 1 or 2, wherein the dynamic time offset is indicated as an explicit number.

Clause 4: The method of any of Clauses 1-3, wherein the dynamic time offset is indicated as an index referring to one of a predefined or preconfigured set of numbers.

Clause 5: The method of any of Clauses 1-4, wherein the dynamic time offset is indicated via a downlink medium access control (MAC) control element (CE).

Clause 6: The method of any of Clauses 1-5, wherein the dynamic time offset is indicated via a group-common or UE-specific downlink control information (DCI).

Clause 7: The method of any of Clauses 1-6, wherein the dynamic time offset is indicated via a group-common DCI.

Clause 8: The method of any of Clauses 1-6, wherein the dynamic time offset is indicated via a UE-specific DCI.

Clause 9: The method of any of Clauses 1-8, wherein the dynamic time offset is indicated for at least one of common search spaces or UE-specific search spaces.

Clause 10: The method of any one of Clauses 1-9, wherein the dynamic time offset is indicated for common search spaces.

Clause 11: The method of any one of Clauses 1-9, wherein the dynamic time offset is indicated for UE-specific search spaces.

Clause 12: The method of any of Clauses 1-11, wherein the UE applies the dynamic time offset depending on at least one of a frequency range or subcarrier spacing.

Clause 13: The method of any of Clauses 1-12, wherein the UE applies the dynamic time offset depending on a frequency range.

Clause 14: The method of any of Clauses 1-12, wherein the UE applies the dynamic time offset depending on a subcarrier spacing.

Clause 15: The method of any of Clauses 1-14, further comprising signaling an indication of a capability of the UE to support dynamic time offsets.

Clause 16: The method of Clause 15, wherein the indication of the UE capability is provided during a random access channel (RACH) procedure or after establishing a radio resource control (RRC) connection.

Clause 17: The method of Clause 14 or 15, wherein the indication of the UE capability is provided during a random access channel (RACH) procedure.

Clause 18: The method of Clause 14 or 15, wherein the indication of the UE capability is provided after establishing a radio resource control (RRC) connection.

Clause 19: A method for wireless communications by a network entity, comprising signaling, to a UE, an indication of a dynamic time offset for monitoring occasions of a search space associated with a CORESET; and, based on the dynamic time offset, transmitting a PDCCH in one or more monitoring occasions.

Clause 20: The method of Clause 19, wherein the dynamic time offset is indicated as a dynamic OFDM symbol offset.

Clause 21: The method of Clause 19 or 20, wherein the dynamic time offset is indicated as an explicit number.

Clause 22: The method of any of Clauses 19-21, wherein the dynamic time offset is indicated as an index referring to one of a predefined or preconfigured set of numbers.

Clause 23: The method of any of Clauses 19-22, wherein the dynamic time offset is indicated via a downlink MAC-CE.

Clause 24: The method of any of Clauses 19-23, wherein the dynamic time offset is indicated via a group-common or UE-specific DCI.

Clause 25: The method of any of Clauses 19-24, wherein the dynamic time offset is indicated via a group-common DCI.

Clause 26: The method of any of Clauses 19-24, wherein the dynamic time offset is indicated via a UE-specific DCI.

Clause 27: The method of any of Clauses 19-26, wherein the dynamic time offset is indicated for at least one of common search spaces or UE-specific search spaces.

Clause 28: The method of any of Clauses 19-27, wherein the dynamic time offset is indicated for common search spaces.

Clause 29: The method of any of Clauses 19-27, wherein the dynamic time offset is indicated for UE-specific search spaces.

Clause 30: The method of any of Clauses 19-29, wherein the network entity applies the dynamic time offset depending on at least one of a frequency range or subcarrier spacing.

Clause 31: The method of any of Clauses 19-30, wherein the network entity applies the dynamic time offset depending on a frequency range.

Clause 32: The method of any of Clauses 19-30, wherein the network entity applies the dynamic time offset depending on a subcarrier spacing.

Clause 33: The method of any of Clauses 19-32, further comprising receiving, from the UE, an indication of a capability of the UE to support dynamic time offsets.

Clause 34: The method of Clause 33, wherein the indication of the UE capability is received during a RACH procedure or after establishing a RRC connection.

Clause 35: The method of Clause 33, wherein the indication of the UE capability is received during a RACH procedure.

Clause 36: The method of Clause 33, wherein the indication of the UE capability is received after establishing a RRC connection.

Clause 37: A method for wireless communications by a user equipment (UE), comprising receiving signaling indicating a dynamic frequency offset relative in a frequency allocation of a control resource set (CORESET); and, based on the dynamic frequency offset, monitoring for a physical downlink control channel (PDCCH) in a search space associated with the CORESET.

Clause 38: The method of Clause 37, wherein the dynamic frequency offset is indicated as a dynamic resource block (RB) offset.

Clause 39: The method of Clause 38, wherein the dynamic RB offset is indicated as a multiple of an integer number.

Clause 40: The method of any of Clauses 37-39, wherein the dynamic frequency offset is indicated as an explicit number.

Clause 41: The method of any of Clauses 37-40, wherein the dynamic frequency offset is indicated as an index referring to one of a predefined or preconfigured set of numbers.

Clause 42: The method of any of Clauses 37-41, wherein the dynamic frequency offset is indicated via a downlink medium access control (MAC) control element (CE).

Clause 43: The method of any of Clauses 37-42, wherein the dynamic frequency offset is indicated via a group-common or UE-specific downlink control information (DCI).

Clause 44: The method of any of Clauses 37-43, wherein the dynamic frequency offset is indicated via a group-common DCI.

Clause 45: The method of any of Clauses 37-43, wherein the dynamic frequency offset is indicated via a UE-specific DCI.

Clause 46: The method of any of Clauses 37-45, wherein the dynamic frequency offset is indicated for a CORESET associated with at least one of common search spaces or UE-specific search spaces.

Clause 47: The method of any of Clauses 37-46, wherein the dynamic frequency offset is indicated for a CORESET associated with common search spaces.

Clause 48: The method of any of Clauses 37-46, wherein the dynamic frequency offset is indicated for a CORESET associated with UE-specific search spaces.

Clause 49: The method of any of Clauses 37-49, wherein the UE applies the dynamic frequency offset depending on at least one of a frequency range or subcarrier spacing.

Clause 50: The method of any of Clauses 37-50, wherein the UE applies the dynamic frequency offset depending on a frequency range.

Clause 51: The method of any of Clauses 37-50, wherein the UE applies the dynamic frequency offset depending on subcarrier spacing.

Clause 52: The method of Clause 37-51, further comprising signaling an indication of a capability of the UE to support dynamic frequency offsets.

Clause 53: The method of Clause 52, wherein the indication is provided during a random access channel (RACH) procedure or after establishing a radio resource control (RRC) connection.

Clause 54: The method of Clause 52 or 53, wherein the indication is provided during a random access channel (RACH) procedure.

Clause 55: The method of Clause 52 or 53, wherein the indication is provided after establishing a radio resource control (RRC) connection.

Clause 56: A method for wireless communications by a network entity, comprising signaling, to a UE, an indication a dynamic frequency offset relative in a frequency allocation of a CORESET; and, based on the dynamic frequency offset, transmitting a PDCCH in a search space associated with the CORESET.

Clause 57: The method of Clause 56, wherein the dynamic frequency offset is indicated as a dynamic RB offset.

Clause 58: The method of Clause 56 or 57, wherein the dynamic RB offset is indicated as a multiple of an integer number.

Clause 59: The method of any of Clauses 56-58, wherein the dynamic frequency offset is indicated as an explicit number.

Clause 60: The method of any of Clauses 56-59, wherein the dynamic frequency offset is indicated as an index referring to one of a predefined or preconfigured set of numbers.

Clause 61: The method of any of Clauses 56-60, wherein the dynamic frequency offset is indicated via a downlink MAC-CE.

Clause 62: The method of any of Clauses 56-61, wherein the dynamic frequency offset is indicated via a group-common or UE-specific DCI.

Clause 63: The method of any of Clauses 56-62, wherein the dynamic frequency offset is indicated via a group-common DCI.

Clause 64: The method of any of Clauses 56-62, wherein the dynamic frequency offset is indicated via a UE-specific DCI.

Clause 65: The method of any of Clauses 56-64, wherein the dynamic frequency offset is indicated for a CORESET associated with at least one of common search spaces or UE-specific search spaces.

Clause 66: The method of any of Clauses 56-65, wherein the dynamic frequency offset is indicated for a CORESET associated with common search spaces.

Clause 67: The method of any of Clauses 56-65, wherein the dynamic frequency offset is indicated for a CORESET associated with UE-specific search spaces.

Clause 68: The method of any of Clauses 56-67, wherein the network entity applies the dynamic frequency offset depending on at least one of a frequency range or subcarrier spacing.

Clause 69: The method of any of Clauses 56-68, wherein the network entity applies the dynamic frequency offset depending on a frequency range.

Clause 70: The method of any of Clauses 56-68, wherein the network entity applies the dynamic frequency offset depending on subcarrier spacing.

Clause 71: The method of any of Clauses 56-71, further comprising receiving an indication of a capability of the UE to support dynamic frequency offsets; and signaling the indication of the dynamic frequency offset in response to receiving the indication of the capability of the UE to support dynamic frequency offsets.

Clause 72: The method of Clause 71, wherein the indication is received during a RACH procedure or after establishing a RRC connection.

Clause 73: The method of Clause 71 or 72, wherein the indication is received during a RACH procedure.

Clause 74: The method of Clause 71 or 72, wherein the indication is received after establishing a RRC connection.

Clause 74: An apparatus, comprising a memory comprising computer-executable instructions and one or more processors configured to execute the computer-executable instructions and cause the one or more processors to perform a method in accordance with any one of Clauses 1-74.

Clause 75: An apparatus, comprising means for performing a method in accordance with any one of Clauses 1-74.

Clause 76: A non-transitory computer-readable medium comprising computer-executable instructions that, when executed by one or more processors, cause the one or more processors to perform a method in accordance with any one of Clauses 1-74.

Clause 78: A computer program product embodied on a computer-readable storage medium comprising code for performing a method in accordance with any one of Clauses 1-74.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmW), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription.

A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

Antennas 252, processors 266, 258, 264, and/or controller/processor 280 of UE 104 and/or antennas 234, processors 220, 230, 238, and/or controller/processor 240 of BS 102 may be used to perform the various techniques and methods described herein.

For example, as shown in FIG. 2, the controller/processor 240 of the BS 102 has dynamic time or frequency offset component 241 that may be configured to perform the operations shown in FIGS. 4B and 7B, as well as other operations described herein for providing an indication of a dynamic time or frequency offset for monitoring occasions of a search space associated with a CORESET. As shown in FIG. 2, the controller/processor 280 of the UE 104 has a dynamic time offset or frequency component 281 that may be configured to perform the operations shown in FIGS. 4B and 7B, as well as other operations described herein for receiving an indication of a dynamic time or frequency offset for monitoring occasions of a search space associated with a CORESET. Although shown at the controller/processor, other components of UE 104 and BS 102 may be used to perform the operations described herein.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of dynamic time (e.g., OFDM symbol) offsets for monitoring occasions in search spaces in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, a digital signal processor (DSP), an application specific integrated circuit (ASIC), or a processor (e.g., a general purpose or specifically programmed processor).

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 4A and FIG. 4B, as well as other operations described herein for providing/receiving an indication of a dynamic time offset for monitoring occasions of a search space associated with a CORESET.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated herein. Various modifications, changes and variations may be made in the arrangement, operation, and details of the methods and apparatus described herein.

The invention claimed is:

1. A method for wireless communications by a user equipment, comprising:
    receiving signaling indicating a dynamic time offset for monitoring occasions of a search space associated with a control resource set (CORESET); and
    based on the dynamic time offset, monitoring for a physical downlink control channel (PDCCH) in the monitoring occasions.

2. The method of claim 1, wherein the dynamic time offset is indicated as a dynamic orthogonal frequency division multiplexed (OFDM) symbol offset.

3. The method of claim 1, wherein the dynamic time offset is indicated as an explicit number.

4. The method of claim 1, wherein the dynamic time offset is indicated as an index referring to one of a predefined or preconfigured set of numbers.

5. The method of claim 1, wherein the dynamic time offset is indicated via a downlink medium access control (MAC) control element (CE).

6. The method of claim 1, wherein the dynamic time offset is indicated via a group-common or user equipment-specific downlink control information (DCI).

7. The method of claim 1, wherein the dynamic time offset is indicated for at least one of common search spaces or user equipment-specific search spaces.

8. The method of claim 1, wherein the user equipment applies the dynamic time offset depending on at least one of a frequency range or subcarrier spacing.

9. The method of claim 1, further comprising signaling an indication of a capability of the user equipment to support dynamic time offsets.

10. The method of claim 9, wherein the indication of the capability of the user equipment is provided during a random access channel (RACH) procedure or after establishing a radio resource control (RRC) connection.

11. A user equipment configured for wireless communication, comprising:
   a memory comprising computer-executable instructions; and
   one or more processors configured to execute the computer-executable instructions and cause the user equipment to:
      receive signaling indicating a dynamic time offset for monitoring occasions of a search space associated with a control resource set (CORESET); and
      based on the dynamic time offset, monitor for a physical downlink control channel (PDCCH) in the monitoring occasions.

12. The user equipment of claim 11, wherein the dynamic time offset is indicated as a dynamic orthogonal frequency division multiplexed (OFDM) symbol offset.

13. The user equipment of claim 11, wherein the dynamic time offset is indicated as an explicit number.

14. The user equipment of claim 11, wherein the dynamic time offset is indicated as an index referring to one of a predefined or preconfigured set of numbers.

15. The user equipment of claim 11, wherein the dynamic time offset is indicated via a downlink medium access control (MAC) control element (CE).

16. The user equipment of claim 11, wherein the dynamic time offset is indicated via a group-common or user equipment-specific downlink control information (DCI).

17. The user equipment of claim 11, wherein the dynamic time offset is indicated for at least one of common search spaces or user equipment-specific search spaces.

18. The user equipment of claim 11, wherein the one or more processors configured to execute the computer-executable instructions and cause the user equipment to apply the dynamic time offset depending on at least one of a frequency range or subcarrier spacing.

19. The user equipment of claim 11, wherein the one or more processors are configured to execute the computer-executable instructions and cause the user equipment to signal an indication of a capability of the user equipment to support dynamic time offsets.

20. A non-transitory computer-readable medium comprising computer-executable instructions that, when executed by one or more processors of a user equipment, cause the user equipment to perform a method of wireless communication, comprising:
   receiving signaling indicating a dynamic time offset for monitoring occasions of a search space associated with a control resource set (CORESET); and
   monitoring for a physical downlink control channel (PDCCH) in the monitoring occasions based on the dynamic time offset.

* * * * *